United States Patent
Suda

(10) Patent No.: US 11,449,580 B2
(45) Date of Patent: Sep. 20, 2022

(54) SERVER APPARATUS AND LICENSE MANAGEMENT SYSTEM

(71) Applicant: FUJIFILM Business Innovation Corp., Tokyo (JP)

(72) Inventor: Jo Suda, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 267 days.

(21) Appl. No.: 16/432,923

(22) Filed: Jun. 5, 2019

(65) Prior Publication Data
US 2019/0384893 A1 Dec. 19, 2019

(30) Foreign Application Priority Data

Jun. 18, 2018 (JP) .............................. JP2018-115258

(51) Int. Cl.
*G06F 21/10* (2013.01)
*H04L 67/53* (2022.01)

(52) U.S. Cl.
CPC ............ *G06F 21/105* (2013.01); *H04L 67/20* (2013.01); *G06F 2221/0757* (2013.01)

(58) Field of Classification Search
CPC .......... G06F 21/105; G06F 2221/0757; G06F 21/10; H04L 67/20
See application file for complete search history.

(56) References Cited

U.S. PATENT DOCUMENTS

| | | | | |
|---|---|---|---|---|
| 7,177,034 B2* | 2/2007 | Nakagawa | ............ | G06F 3/1222 358/1.14 |
| 7,231,370 B1* | 6/2007 | Kapur | ................... | G06Q 10/06 705/50 |
| 8,068,810 B2* | 11/2011 | Wills | ...................... | H04L 12/14 455/406 |
| 8,576,880 B1* | 11/2013 | Vargantwar | ......... | H04W 68/025 370/476 |
| 10,261,453 B2* | 4/2019 | Tomihisa | ........... | G03G 15/5008 |
| 2002/0165826 A1* | 11/2002 | Yamamoto | .............. | G06F 21/10 705/59 |
| 2002/0169725 A1* | 11/2002 | Eng | ...................... | G06Q 30/018 705/317 |

(Continued)

FOREIGN PATENT DOCUMENTS

| | | |
|---|---|---|
| JP | 2002297254 | 10/2002 |
| JP | 2008077492 | 4/2008 |
| JP | 2010128807 | 6/2010 |

OTHER PUBLICATIONS

Office Action of Japan Counterpart Application, with English translation thereof, dated Mar. 15, 2022, pp. 1-5.

(Continued)

*Primary Examiner* — David Garcia Cervetti
(74) *Attorney, Agent, or Firm* — JCIPRNET

(57) ABSTRACT

A server apparatus includes a total amount obtaining unit that obtains a total amount of use permitted according to a contract in a service used by plural users, an upper limit value obtaining unit that obtains an upper limit value of use of the service for each of the plural users, and a changing unit that changes, in a case where a user having a use amount of the service likely to exceed the upper limit value exists among the plural users, the upper limit value of the user to be increased within a range of the total amount.

7 Claims, 12 Drawing Sheets

(56) References Cited

U.S. PATENT DOCUMENTS

| | | | |
|---|---|---|---|
| 2003/0126456 A1* | 7/2003 | Birzer | G06F 21/105 713/193 |
| 2004/0078339 A1* | 4/2004 | Goringe | G06F 21/105 705/59 |
| 2004/0148262 A1* | 7/2004 | Yamamoto | G06F 21/105 705/59 |
| 2005/0120244 A1* | 6/2005 | Choi | H04L 63/083 726/4 |
| 2005/0275867 A1* | 12/2005 | Higashiura | G06K 15/1805 358/1.14 |
| 2005/0275868 A1* | 12/2005 | Higashiura | G06K 15/00 358/1.14 |
| 2005/0289072 A1* | 12/2005 | Sabharwal | G06F 21/121 705/59 |
| 2006/0195404 A1* | 8/2006 | Elteto | G06Q 10/00 705/59 |
| 2006/0262344 A1* | 11/2006 | Matsuda | G06F 3/1219 358/1.15 |
| 2007/0097448 A1* | 5/2007 | Iizuka | G06F 21/608 358/1.16 |
| 2008/0007760 A1* | 1/2008 | Kimura | G06F 21/608 358/1.14 |
| 2008/0094657 A1* | 4/2008 | Ikegami | G06F 3/1239 358/1.15 |
| 2008/0215468 A1* | 9/2008 | Monsa-Chermon | G06Q 30/04 705/400 |
| 2008/0249904 A1* | 10/2008 | Eibach | G06Q 30/0283 709/201 |
| 2008/0289044 A1* | 11/2008 | Choi | G06F 21/10 726/26 |
| 2009/0034015 A1* | 2/2009 | Mulligan | H04N 1/00832 358/408 |
| 2009/0138975 A1* | 5/2009 | Richardson | G06F 21/73 726/32 |
| 2009/0225356 A1* | 9/2009 | Satoh | G06F 3/1239 358/1.15 |
| 2009/0248428 A1* | 10/2009 | Disciascio | G06Q 10/00 705/306 |
| 2009/0249493 A1* | 10/2009 | Disciascio | G06F 21/10 726/31 |
| 2009/0249494 A1* | 10/2009 | Disciascio | G06F 21/10 726/31 |
| 2010/0079800 A1* | 4/2010 | Muto | G06F 3/1259 358/1.15 |
| 2010/0118340 A1* | 5/2010 | Yamada | G06F 3/1288 358/1.15 |
| 2010/0192212 A1* | 7/2010 | Raleigh | G06Q 30/0284 726/7 |
| 2011/0010216 A1* | 1/2011 | Bhogal | G06Q 50/184 705/310 |
| 2011/0075191 A1* | 3/2011 | Meunier | H04N 1/00244 358/1.15 |
| 2011/0102834 A1* | 5/2011 | Makishima | G06F 3/1222 358/1.15 |
| 2011/0188073 A1* | 8/2011 | Akutsu | G06F 15/00 358/1.15 |
| 2011/0275344 A1* | 11/2011 | Momtahan | H04L 12/1417 455/466 |
| 2012/0057183 A1* | 3/2012 | Tsujimoto | H04N 1/00938 358/1.13 |
| 2012/0069356 A1* | 3/2012 | Kubo | G06K 15/408 358/1.2 |
| 2012/0089845 A1* | 4/2012 | Raleigh | H04L 41/0893 709/224 |
| 2012/0099143 A1* | 4/2012 | Sasagawa | G06F 3/1285 358/1.15 |
| 2012/0317285 A1* | 12/2012 | Allen | H04L 51/14 709/225 |
| 2013/0308147 A1* | 11/2013 | Wu | G06F 3/1239 358/1.13 |
| 2014/0182001 A1* | 6/2014 | Matsumoto | G06F 21/10 726/31 |
| 2014/0211232 A1* | 7/2014 | Ganesan | G06F 3/1288 358/1.14 |
| 2015/0186078 A1* | 7/2015 | Ozawa | G06F 3/1288 358/1.13 |
| 2015/0237229 A1* | 8/2015 | Ohara | H04N 1/34 358/1.15 |
| 2016/0231686 A1* | 8/2016 | Itoh | G03G 15/502 |
| 2017/0060490 A1* | 3/2017 | Rajalingam | G06F 3/1217 |
| 2017/0109506 A1* | 4/2017 | Shetty | G06F 16/13 |
| 2017/0220779 A1* | 8/2017 | Minagawa | G06F 21/10 |
| 2018/0052713 A1* | 2/2018 | Marnell | G06F 9/5027 |
| 2018/0088505 A1* | 3/2018 | Tomihisa | G03G 15/502 |
| 2018/0225729 A1* | 8/2018 | Li | G06Q 30/0283 |
| 2018/0257418 A1* | 9/2018 | Shimada | G06K 15/1867 |
| 2019/0347181 A1* | 11/2019 | Cranfill | G06F 3/04817 |
| 2019/0384893 A1* | 12/2019 | Suda | G06F 21/10 |
| 2021/0092185 A1* | 3/2021 | DeRosa-Grund | H04L 9/3247 |

OTHER PUBLICATIONS

"Office Action of Japan Counterpart Application", dated Jul. 19, 2022, with English translation thereof, p. 1-p. 7.

* cited by examiner

FIG. 4A
FIRST RESERVATION TABLE

| USER ID | TARGET MONTH | 1 | 2 | 3 | ... | 31 |
|---|---|---|---|---|---|---|
| fx29710 | 03/2018 | 4 | 4 | 4 | ... | 0 |
| fx29711 | ... | | | | | |

FIG. 4B
SECOND RESERVATION TABLE

| USER ID | TARGET MONTH | UPPER LIMIT VALUE | PLANNED USE AMOUNT | REMAINING VALUE |
|---|---|---|---|---|
| fx29710 | 03/2018 | 30 | 12 | 18 |
| fx29711 | ... | ... | ... | ... |

FIG. 4C
UPPER LIMIT VALUE SETTING TABLE

| ADMINISTRATOR ID | USER ID | UPPER LIMIT VALUE | PRESCRIBED VALUE |
|---|---|---|---|
| fx77777 | fx29710 | 30 | 80% |
| fx77777 | fx29711 | 15 | 90% |

FIG. 4D
RESOURCE ASSIGNMENT TABLE

| ADMINISTRATOR ID | TARGET MONTH | BUFFER | NUMBER OF CONTRACT USERS | NUMBER OF ASSIGNED USERS | TOTAL CONTRACT TIME | TOTAL ASSIGNED-TIME |
|---|---|---|---|---|---|---|
| fx77777 | 03/2018 | 950 | 100 | 92 | 3000 | 2050 |
| fx88888 | 03/2018 | 300 | 50 | 48 | 1500 | 1200 |

FIG. 4E
USE INFORMATION TABLE

| USER ID | TARGET MONTH | RESERVATION/RECORD DIFFERENCE | 1 | 2 | 3 | ... | 31 |
|---|---|---|---|---|---|---|---|
| fx29710 | 03/2018 | 4 | 4 | 4 | 0 | ... | 0 |
| fx29711 | ... | | | | | | |

FIG. 6

| TARGET MONTH: 03/2018 | ID: fx77777 |
| --- | --- |
| | NAME: xxxx |

NUMBER OF LICENSED USERS: 100    NUMBER OF ASSIGNED USERS: 92
TOTAL CONTRACT TIME: 3000 HOURS   TOTAL ASSIGNED-TIME: 2050 HOURS
BUFFER: 950 HOURS

MANAGEMENT TARGET USER LIST

| USER ID | REMAINING VALUE | ASSIGNED AMOUNT | PRESCRIBED VALUE | RESERVATION/ RECORD DIFFERENCE ▼ | |
| --- | --- | --- | --- | --- | --- |
| fx29710 | 18 | 30 | 90% | 4 | △ |
| fx29711 | ... | ... | ... | ... | ... |
| ... | ... | ... | ... | ... | ▽ |

UPDATE

FIG. 8

RESERVATION SCREEN                                ID: fx29710

UPPER LIMIT OF MARCH 2018: 30 HOURS               NAME: xxxx
REMAINING HOURS: 18

[<<]                    MARCH                     [>>]

SUNDAY   MONDAY   TUESDAY  WEDNESDAY  THURSDAY  FRIDAY  SATURDAY

|  |  |  |  | 1 | 2 | 3 |
|  |  |  |  | 4 h | 4 h | 4 h |
| 4 | 5 | 6 | 7 | 8 | 9 | 10 |
| h | h | h | h | h | h | h |
| 11 | 12 | 13 | 14 | 15 | 16 | 17 |
| h | h | h | h | h | h | h |
| 18 | 19 | 20 | 21 | 22 | 23 | 24 |
| h | h | h | h | h | h | h |
| 25 | 26 | 27 | 28 | 29 | 30 | 31 |
| h | h | h | h | h | h | h |

[UPDATE]

FIG. 9

| TITLE : | 【RESERVATION】<br>【PRESCRIBED VALUE IS EXCEEDED】 |
|---|---|
| DESTINATION : | ADMINISTRATOR; USER |
| BODY : | PRESCRIBED VALUE TO UPPER LIMIT VALUE IS EXCEEDED.<br>PLEASE, PERFORM PLANNED-REVIEW OF USE TIME OR REVIEW UPPER LIMIT VALUE AFTER CONSULTING WITH ADMINISTRATOR.<br>USER ID: xxxxx<br>NAME: xxxxx<br>UPPER LIMIT VALUE: 30 HOURS<br>RESERVATION VALUE: 28 HOURS |

FIG. 12

| TITLE : | 【RECORD】<br>【PRESCRIBED VALUE IS EXCEEDED】 |
|---|---|
| DESTINATION : | ADMINISTRATOR; USER |
| BODY : | PRESCRIBED VALUE TO UPPER LIMIT VALUE IS EXCEEDED.<br>PLEASE, REVIEW UPPER LIMIT VALUE AFTER CONSULTING WITH ADMINISTRATOR.<br>USER ID: xxxxx<br>NAME: xxxxx<br>UPPER LIMIT VALUE: 30 HOURS<br>CURRENT: 29 HOURS |

FIG. 13

| TITLE : | 【UPPER LIMIT VALUE IS CHANGED】 |
|---|---|
| DESTINATION : | USER; ADMINISTRATOR |
| BODY : | ADMINISTRATOR ID: fx99999<br>USER ID: xxxxx<br><br>ADMINISTRATOR: BY xxxxx (NAME)<br>USER: UPPER LIMIT VALUE OF xxxxx (NAME) IS CHANGED.  CHECK, PLEASE.<br><br>UPPER LIMIT VALUE AFTER CHANGE: 50 HOURS<br>UPPER LIMIT VALUE BEFORE CHANGE: 30 HOURS |

FIG. 14

| TITLE : | 【PRESCRIBED VALUE IS CHANGED】 |
|---|---|
| DESTINATION : | USER; ADMINISTRATOR |
| BODY : | ADMINISTRATOR ID: fx99999<br>USER ID: xxxxx<br><br>ADMINISTRATOR: BY xxxxx (NAME)<br>USER: PRESCRIBED VALUE OF xxxxx (NAME) IS CHANGED. CHECK, PLEASE.<br><br>PRESCRIBED VALUE AFTER CHANGE: 80%<br>PRESCRIBED VALUE BEFORE CHANGE: 90% |

US 11,449,580 B2

SERVER APPARATUS AND LICENSE MANAGEMENT SYSTEM

CROSS-REFERENCE TO RELATED APPLICATIONS

This application is based on and claims priority under 35 USC 119 from Japanese Patent Application No. 2018-115258 filed Jun. 18, 2018.

BACKGROUND

(i) Technical Field

The present invention relates to a server apparatus and a license management system.

(ii) Related Art

As networks are spread, a license server increasingly gives permission to use software to a user based on a license contract. There are a single license and a plurality of licenses as types of licenses in this type of license management system. In the single license, only one user is permitted to use the software at the same time. Therefore, in a case where requests for using the software from the plurality of users conflict with one another, other users wait to use the software until the user who requests to use the software in advance completes the use of the software. Alternatively, it is necessary to provide adjustment work such as determination in advance of use time zones between the users. In the plurality of licenses, the plurality of users may use the software at the same time. However, billing forms in the plurality of licenses are not necessarily billing forms corresponding to use records of the users, so that in many cases, an unnecessarily expensive charge is set and the billing form is generally unwilling to the user. JP2002-297254A discloses a system capable of performing effective billing in a case of the plurality of licenses. Specifically, in a technology in JP2002-297254A, software is permitted to be used under a condition that a use amount of the software for all of a plurality of users belonging to license contractors is within a contract range and a use amount for each of the users is within the contract range. Therefore, it is possible to efficiently use a contracted flow rate and it is possible to improve usability.

SUMMARY

Aspects of non-limiting embodiments of the present disclosure relate to a license management system which gives permission to use a service to a plurality of users, in which it is possible to change an upper limit value of use for each of the users while keeping an upper limit of a total use amount for all of the users.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a server apparatus including: a total amount obtaining unit that obtains a total amount of use permitted according to a contract in a service used by a plurality of users; an upper limit value obtaining unit that obtains an upper limit value of use of the service for each of the plurality of users; and a changing unit that changes, in a case where a user having a use amount of the service likely to exceed the upper limit value exists among the plurality of users, the upper limit value of the user to be increased within a range of the total amount.

BRIEF DESCRIPTION OF THE DRAWINGS

Exemplary embodiment(s) of the present invention will be described in detail based on the following figures, wherein:

FIGS. 4A to 4E are diagrams illustrating various types of tables used by the license server;

FIG. 6 is a diagram illustrating a management screen;

FIG. 8 is a diagram illustrating a reservation screen displayed on the user terminal;

FIG. 9 is a diagram illustrating an alert mail transmitted in a case where a use reservation time exceeds a prescribed value;

FIG. 12 is a diagram illustrating an alert mail transmitted in a case where a use time exceeds a prescribed value;

FIG. 13 is a diagram illustrating a change notification mail of an upper limit value; and FIG. 14 is a diagram illustrating a change notification mail of the prescribed value.

DETAILED DESCRIPTION

1. Configuration

Figure 1:
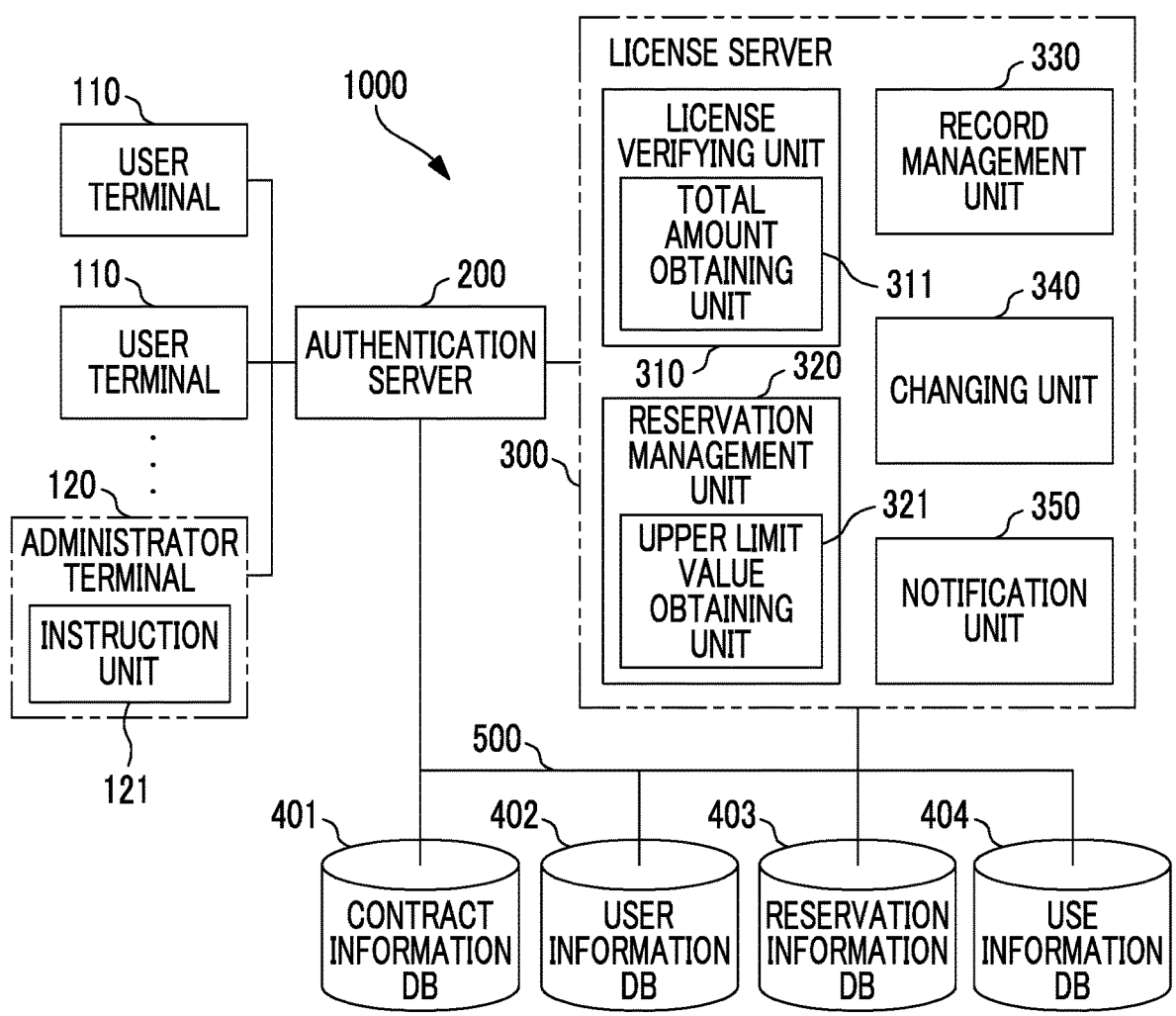
FIG. 1 is a block diagram illustrating a configuration of a license management system according to an exemplary embodiment.

FIG. 1 is a block diagram illustrating a configuration of a license management system 1000 according to an exemplary embodiment of the present invention. The license management system 1000 includes a plurality of user terminals 110, an administrator terminal 120, an authentication server 200, a license server 300 according to a server apparatus of the exemplary embodiment of the invention, a contract information database (DB) 401 stored in a storage device such as a hard disk, a user information DB 402, a reservation information DB 403, and a use information DB 404.

Figure 2:
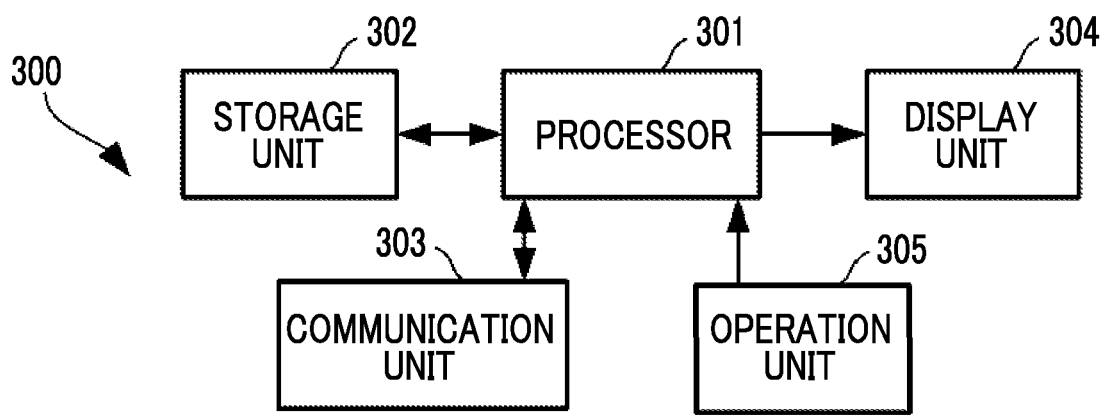
FIG. 2 is a block diagram illustrating a configuration of a license server according to the exemplary embodiment.

FIG. 2 is a diagram illustrating an example of a hardware configuration of the license server 300. The license server 300 is, for example, a personal computer. As illustrated in FIG. 2, the license server 300 includes a processor 301, a storage unit 302 including a volatile storage unit and a nonvolatile storage unit, a communication unit 303 including a function of performing communication via a network, a display unit 304 including a liquid crystal display or the like, and an operation unit 305 including operation elements such as a keyboard, a mouse, and the like. The nonvolatile storage unit of the storage unit 302 stores various types of programs executed by the processor 301. The authentication server 200 has the same configuration as the license server 300.

Figure 3:
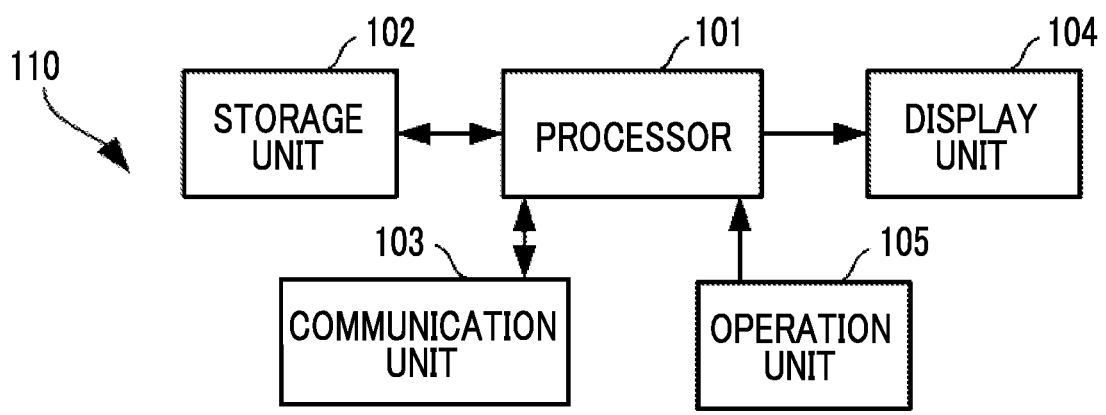
FIG. 3 is a block diagram illustrating an example of a configuration of a user terminal.

FIG. 3 is a block diagram illustrating a configuration example of the user terminal 110. The user terminal 110 may be a personal computer, a tablet terminal or a mobile terminal such as a smartphone. As illustrated in FIG. 3, the user terminal 110 includes a processor 101, a storage unit 102 including a volatile storage unit and a nonvolatile storage unit, a communication unit 103 including a function of performing communication via the network, a display unit 104, and an operation unit 105. The nonvolatile storage unit of the storage unit 102 stores various types of programs executed by the processor 101.

In FIG. 1, the user terminal 110 is a terminal operated by a user to use an application managed by the license server 300. The administrator terminal 120 is a terminal operated by an administrator who manages users. In the present exemplary embodiment, one user or a plurality of users belong to one administrator. By operating the administrator terminal 120, the administrator manages use of the application by one user or each of the plurality of users belonging to the administrator. The administrator terminal 120 includes an instruction unit 121. The instruction unit 121 performs various types of instructions. The instruction performed by the instruction unit 121 includes an instruction to a changing unit 340 to be described below. The authentication server 200 is a server which authenticates whether or not the user who operates the user terminal 110 or the administrator who operates the administrator terminal 120 is the user himself/herself or the administrator himself/herself. The license server 300 is a server which permits the user to use the application on a condition determined in a license contract.

Features of the license management system 1000 according to the present exemplary embodiment are as follows. These features are usually realized by operations of the license server 300.

In the present exemplary embodiment, a total amount indicating a limit of a total sum of use times of the application for each of the users belonging to one administrator is determined for each of months. There may be differences in lengths between the use times of each of the users, but the total sum of the use times of each of the users per month needs to be within a range of the total amount.

The administrator determines an upper limit value of the use time per month of the application for each of the users so as to keep the total sum of the use times for each of the users belonging to the administrator within the range of the total amount. Each of the users may use the application within the range of the upper limit value determined for the user.

In order to call attention to the user and the administrator, a prescribed value (value smaller than upper limit value) is determined in addition to the upper limit value for each of the users, and in a case where a use amount exceeds the prescribed value, that the use amount exceeds the prescribed value is notified to the user and the administrator.

There is a possibility that the use times of the application by each of the users have differences in lengths according to an influence such as a workload or the like of each of the users and the use times of some users exceed the upper limit value. For this case, in the present exemplary embodiment, the upper limit value for each of the users is permitted to be changed. However, the upper limit value is permitted to be changed so that a total sum of the upper limit values of the respective users belonging to one administrator is within a range not exceeding the total amount.

In addition, in the present exemplary embodiment, the user makes a reservation of the use time so as to appropriately secure the range of the change of the upper limit value. That is, the reservation is as follows. In present exemplary embodiment, the user makes the reservation of the use time every month. The user may reserve the use time within the range not exceeding a prescribed value set to the user. In the present exemplary embodiment, a time is obtained by subtracting the total sum of use reservation times of the respective users belonging to one administrator from the total amount and the time is handled as a use amount shared by the plurality of users belonging to the administrator. In the present exemplary embodiment, the use amount shared by the plurality of users is referred to as "buffer". In the present exemplary embodiment, in a case where it is necessary to change the upper limit value for a certain user to be larger, the buffer is permitted to be changed within the range of the buffer.

In FIG. 1, the license server 300 and the authentication server 200 are connected from each other via a LAN 500. In addition, the contract information DB 401, the user information DB 402, the reservation information DB 403, and the use information DB 404 are connected to the LAN 500. The license server 300 and the authentication server 200 may use these DBs via the LAN 500.

For example, the contract information DB 401 is a DB which stores information determined in the license contract such as information specifying the administrator and the user belonging to contractors, the total amount (total use time in present exemplary embodiment) of the application use allowed for all of the users belonging to the administrator, and the like. The user information DB 402 is a DB including information or the like indicating a condition that the user may use the application for each of the users who have permission for using the application according to the license contract. The reservation information DB 403 is a DB including information indicating a use reservation status of the application which the user uses. The use information DB 404 is a DB including information related to a use record of the application which the user uses.

FIGS. 4A to 4E illustrate various types of tables used in the present exemplary embodiment. A first reservation table illustrated in FIG. 4A and a second reservation table illustrated in FIG. 4B are tables stored in the reservation information DB 403. The first reservation table is a table in which the use reservation time input by the user for each of days belonging to a target month (normally the day to which the day belongs) is recorded in association with a user ID of each of the users having permission to use the application. The second reservation table is a table obtained by summarizing the first reservation table and adding the upper limit value and a remaining value for each of the users. In the second reservation table, a planned use amount is a total sum of use reservation times for each of days in a target month recorded in the first reservation table. The upper limit value is an upper limit value to which the upper limit value in an upper limit value setting table described below is applied. The remaining value is a remainder obtained by subtracting the planned use amount from the upper limit value.

The upper limit value setting table illustrated in FIG. 4C and a resource assignment table illustrated in FIG. 4D are tables stored in the user information DB 402. The upper limit value setting table is a table indicating the upper limit value and the prescribed value in association with the user ID of each of the users having permission to use the application. The prescribed value is data expressing a limit value of the use time for transmitting an alert by a ratio to the upper limit value for the user and the administrator. The resource assignment table is a table indicating a buffer in the target month (normally the day to which the day belongs), the number of contract users belonging to the administrator, the number of assigned users, a total contract time, and a total assigned-time in association with an administrator ID of the administrator of each of the users having permission to use the application. Here, the number of assigned users is the number of users who complete to set the upper limit value among the users belonging to the administrator. In addition, the total assigned-time is a total sum of the upper limit values for the user who completes to set the upper limit value among the users belonging to the administrator.

A use information table illustrated in FIG. 4E is a table stored in a use information DB. The use information table is a table indicating the use time (record) of the application in each of days belonging to the target month in association with the user ID of each of the users having permission to use the application.

In FIG. 1, the license server 300 includes a license verifying unit 310 having a total amount obtaining unit 311, a reservation management unit 320 having an upper limit value obtaining unit 321, a record management unit 330, the changing unit 340, and a notification unit 350. These units have functions realized by the processor 301 in FIG. 2 executing the program in the storage unit 302.

In a service used by the plurality of users, that is, the use of the application which is a management target of the license server 300, the total amount obtaining unit 311 obtains the total amount of the uses permitted according to the license contract from the contract information DB 401. Then, the total amount of the uses is applied as the total contract time to the resource assignment table in FIG. 4D.

The reservation management unit 320 receives an input of the use reservation time of the application from the user and generates the first reservation table in FIG. 4A and the second reservation table in FIG. 4B. In addition, the upper limit value obtaining unit 321 included in the reservation management unit 320 obtains the upper limit value and the prescribed value set to each of the users by the administrator and applies the upper limit value and the prescribed value to the upper limit value setting table illustrated in FIG. 4C and the resource assignment table illustrated in FIG. 4D.

The record management unit 330 monitors the application used by the user and applies the use record of the application to the use information table illustrated in FIG. 4E.

In a case where the user having the use amount of the service, that is, the use time of the application likely to exceed the upper limit value exists among the plurality of users, the changing unit 340 changes to increase the upper limit value of the user within the range of the total amount. Specifically, the upper limit value is permitted to be changed within the range permitted by the buffer. In the present exemplary embodiment, the changing unit 340 changes the upper limit value according to a change request (instruction via instruction unit 121) of the upper limit value performed by the administrator terminal 120 operated by the administrator.

The notification unit 350 is a means for transmitting various messages to the user and the administrator. The notification unit 350 transmits an alert mail to the user having the total sum of the use reservation time exceeding a prescribed value and the administrator of the user. In addition, the notification unit 350 transmits the alert mail to the user having the use time (record) exceeding the prescribed value and the administrator of the user. Further, the notification unit 350 transmits the change notification mail to the user and the administrator of the user having the changed upper limit value or the changed prescribed value.

2. Operation

Figure 5:
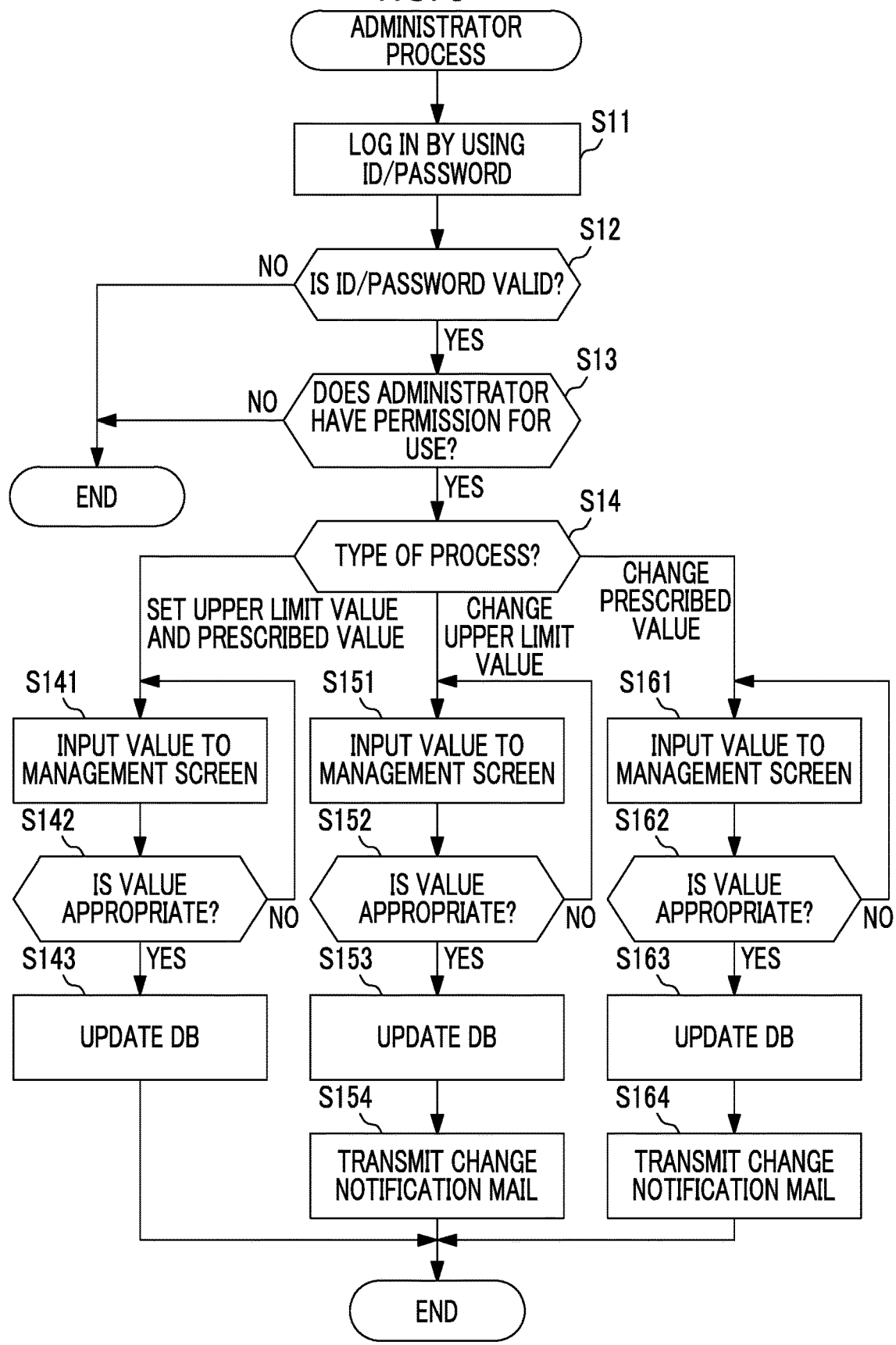
FIG. 5 is a flowchart illustrating an administrator process.

FIG. 5 is a flowchart illustrating an administrator process executed in the present exemplary embodiment. The administrator process is a process activated in a case of setting the upper limit value or the prescribed value and changing the upper limit value or the prescribed value for the users belonging to the administrator.

The administrator inputs the administrator ID and a password to the administrator terminal 120 so as to log in the license server 300 (step S11). The authentication server 200 determines whether or not the administrator ID and the password input by the administrator is valid by referring to the contract information DB 401 (step S12). In a case where the administrator ID and the password is not valid, the administrator process is terminated.

In a case where the administrator ID and the password is valid, the authentication server 200 causes the administrator terminal 120 to log in the license server 300. In this case, in the license server 300, the license verifying unit 310 refers to the contract information DB 401 to determine whether or not the administrator ID input to the administrator terminal 120 is the administrator ID of the administrator who has permission to use the license server 300 (step S13). In a case where a determination result is "NO", the administrator process is terminated.

In a case where the determination result is "YES" in step S13, the license server 300 causes the administrator who operates the administrator terminal 120 to select one of an upper limit value and prescribed value setting and an upper limit value change or a prescribed value change (step S14). Hereinafter, an operation in a case where the administrator selects the upper limit value and prescribed value setting will be described. An operation in a case where the administrator selects the upper limit value change or the prescribed value change will be described below.

In the case where the administrator selects the upper limit value and prescribed value setting, the license server 300 causes the reservation management unit 320 to display a management screen on the administrator terminal 120 so as to receive an input of a value (step S141).

FIG. 6 is a diagram illustrating an example of the management screen displayed on the administrator terminal 120. As illustrated in FIG. 6, various types of information in association with the administrator ID used for logging in the license server 300 is displayed on the management screen. Specifically, information on license conditions such as the number of licensed users and the total contract time, and information on a use status of licenses such as the number of assigned users, the total assigned-time, and a buffer are displayed. As described above, the number of assigned users is the number of users who already set the upper limit value among all the users belonging to the administrator having the administrator ID. The total assigned-time is a total sum of the upper limit values for the users who already set the upper limit value. The buffer is the time obtained by subtracting a total sum of the use reservation amounts reserved to be used from the total contract time. The reservation management unit 320 refers to the resource assignment table (see FIG. 4D) and displays these pieces of information on the management screen.

In addition, in a lower half of the management screen, a list of the users to be managed is displayed. The list of the users to be managed is a list of the user ID, the remaining value, an assigned amount, the prescribed value, and a reservation/record difference for each of all of the users in association with the administrator ID. The reservation management unit 320 refers to the resource assignment table (see FIG. 4D) and the upper limit value setting table (see FIG. 4C), and displays these pieces of information on the management screen.

As described above, the assigned amount indicates the upper limit value set for the user ID. The prescribed value is a ratio of the use amount for outputting an alarm to the upper limit value. In a case of the user having the user ID=fx29710, since the upper limit value (assigned amount) is 30 hours and the prescribed value is 90%, the alarm is generated in a case where the use amount exceeds 30 hours×90%=27 hours.

The remaining value is a value obtained by subtracting the current use amount from the upper limit value. In the case of the user having the user ID=fx29710, since the upper limit value (assigned amount) is 30 hours and the remaining value is 18 hours, the current use amount is 12 hours. The reservation/record difference is a time obtained by subtracting the current use amount from the use amount reserved by the user. In the case of the user having the user ID=fx29710, since the reservation/record difference is 4 hours and the current use amount is 12 hours, a reservation use amount is 16 hours.

In a state in which the management screen is displayed, the administrator may select the user ID of a chosen user by a mouse click operation or the like and may input the upper limit value and the prescribed value to be corresponded to the user ID, for example.

In FIG. 5, in the license server 300, in a case where the upper limit value and the prescribed value are input, the upper limit value obtaining unit 321 of the reservation management unit 320 determines whether or not the values are valid (step S142). Specifically, it is determined whether a total sum of the upper limit values set to all of the users belonging to the administrator in a case of accepting a setting of the upper limit value is within the total contract time or the prescribed value is within 100%.

In a case where a determination result is "NO", the process returns to step S141 and the upper limit value and the prescribed value to be associated with the user ID are input again. In addition, in a case where the determination result is "YES" in step S142, the upper limit value and the prescribed value input by the administrator are accepted and the DB is updated (step S143). Specifically, in the upper limit value setting table (see FIG. 4C), the upper limit value obtaining unit 321 sets the upper limit value and the prescribed value input by the administrator as the upper limit value and the prescribed value corresponding to the user ID (step S143). Then, the administrator process is terminated.

Figure 7:
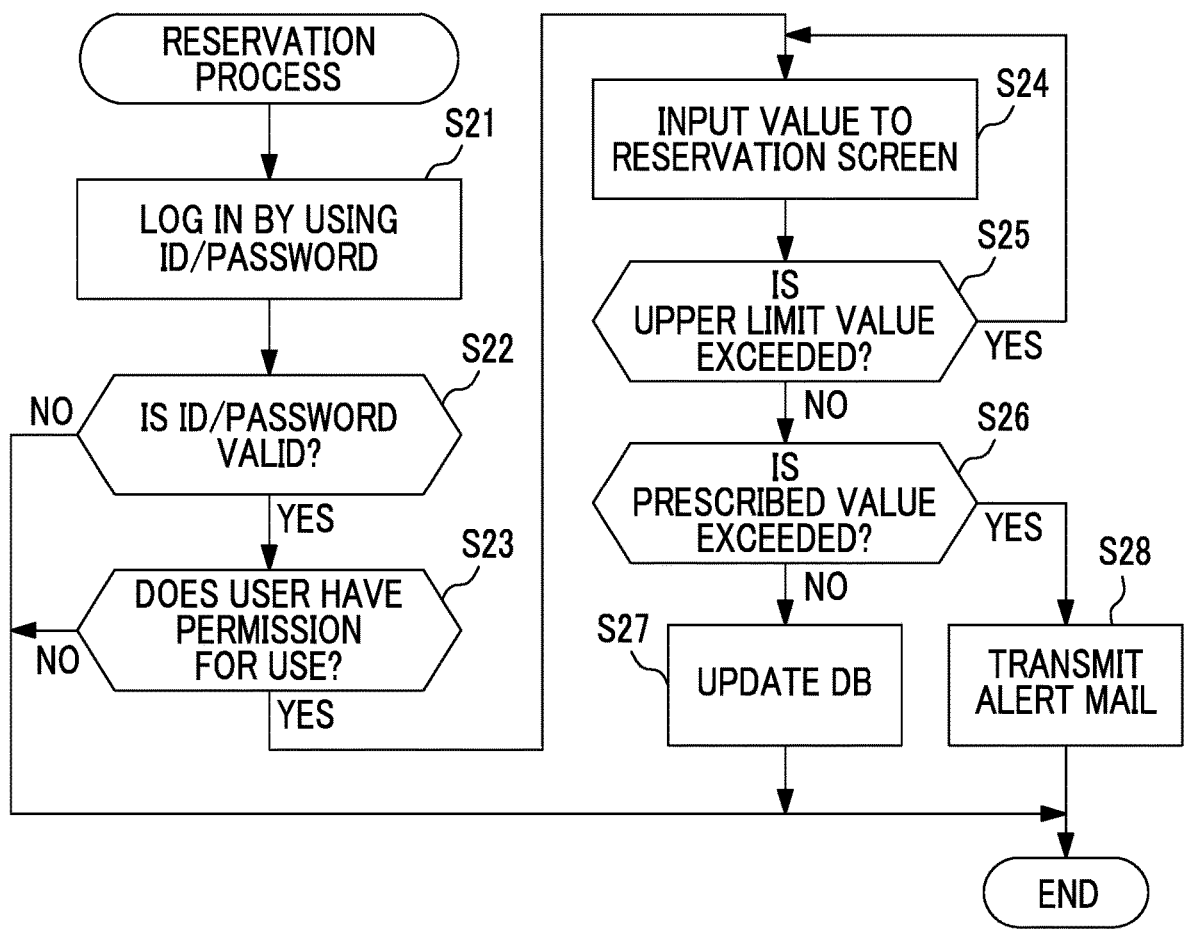
FIG. 7 is a flowchart illustrating a reservation process.

FIG. 7 is a flowchart illustrating a reservation process executed in the present exemplary embodiment. The reservation process is a process executed in a case where the user inputs the use reservation time. The user who wants to reserve use of the application inputs a user ID and a password to the user terminal 110 so as to log in to the license server 300 (step S21). The authentication server 200 determines whether or not the user ID and the password input by the user is valid by referring to the contract information DB 401 (step S22). In a case where the user ID and the password is not valid, the reservation process is terminated. In a case where the user ID and the password is valid, the authentication server 200 causes the user terminal 110 to log in the license server 300. In this case, in the license server 300, the license verifying unit 310 refers to the contract information DB 401 to determine whether or not the user ID input to the user terminal 110 is the user ID of the user who has permission to use the license server 300 (step S23). In a case where a determination result is "NO", the reservation process is terminated. In a case where the determination result is "YES", the license server 300 causes the reservation management unit 320 to display a reservation screen on the user terminal 110 so as to receive an input of a value (step S24).

FIG. 8 is a diagram illustrating the reservation screen displayed on the user terminal 110 in the present exemplary embodiment. As illustrated in FIG. 8, a calendar of a current month is displayed together with the user ID and a name of the logged-in user on the reservation screen. The user may input a numerical value indicating the use reservation time to a field indicating each of days of the current month in the calendar. Then, the user may request the license server 300 to accept the input of the use reservation time by instructing a soft button including a text string of "update" displayed under the calendar.

In a case where the user requests the input of the use reservation time, the reservation management unit 320 of the license server 300 refers to the upper limit value setting table (see FIG. 4C) to determine whether or not the use reservation time required to be input by the user exceeds the upper limit value of the use time of the user determined by the upper limit value setting table (step S25).

In a case where a determination result is "YES", the process returns to step S24 and the use reservation time is input again. In addition, in a case where the determination result is "NO" in step S25, the reservation management unit 320 executes the process in step S26.

In step S26, the reservation management unit 320 refers to the upper limit value setting table (see FIG. 4C) and reads the upper limit value and the prescribed value in association with the user ID of the user which is an input requestor of the use reservation time to determine whether or not the total sum of the use reservation times required to be input by the user exceeds a value obtained by multiplying the prescribed value by the upper limit value.

In a case where a determination result is "NO", the reservation management unit 320 updates the DB (step S27). Specifically, for example, in a case where the user having the user ID=fx29710 requests to input the use reservation time for March 2018, as illustrated in FIG. 4A, in association with the user ID=fx29710, the use time input by the user is written in the first reservation table so that 4 hours on March 1, 4 hours on March 2, 4 hours on March 3, and the like. According to the update of the first reservation table, as illustrated in FIG. 4B, the reservation management unit 320 writes 12 hours in association with the user ID=fx29710 in the second reservation table as the planned use amount for March 2018. The second reservation table includes items of the upper limit value and the remaining value in addition to the planned use amount. Here, the upper limit value is an upper limit value to which the upper limit value associated with the same user ID in the upper limit value setting table (see FIG. 4C) is applied. In addition, the remaining value is a remaining value to which a value obtained by subtracting the planned use amount from the upper limit value is applied. In a case where the process in step S27 is completed, the reservation process is terminated.

On the other hand, in a case where the determination result in step S26 is "YES", the license server 300 causes the notification unit 350 to transmit the alert mail (step S28). The alert mail is transmitted to the user terminal 110 of the user which is an input requestor of the use reservation time and the administrator terminal 120 of the administrator who manages the user as destinations.

FIG. 9 is a diagram illustrating an example of the alert mail transmitted in step S28. As illustrated in FIG. 9, the alert mail includes information indicating the upper limit value and the use reservation time for the user which is an input requestor of the use reservation time. In a case where the process in step S28 is completed, the reservation process is terminated.

Figure 10:
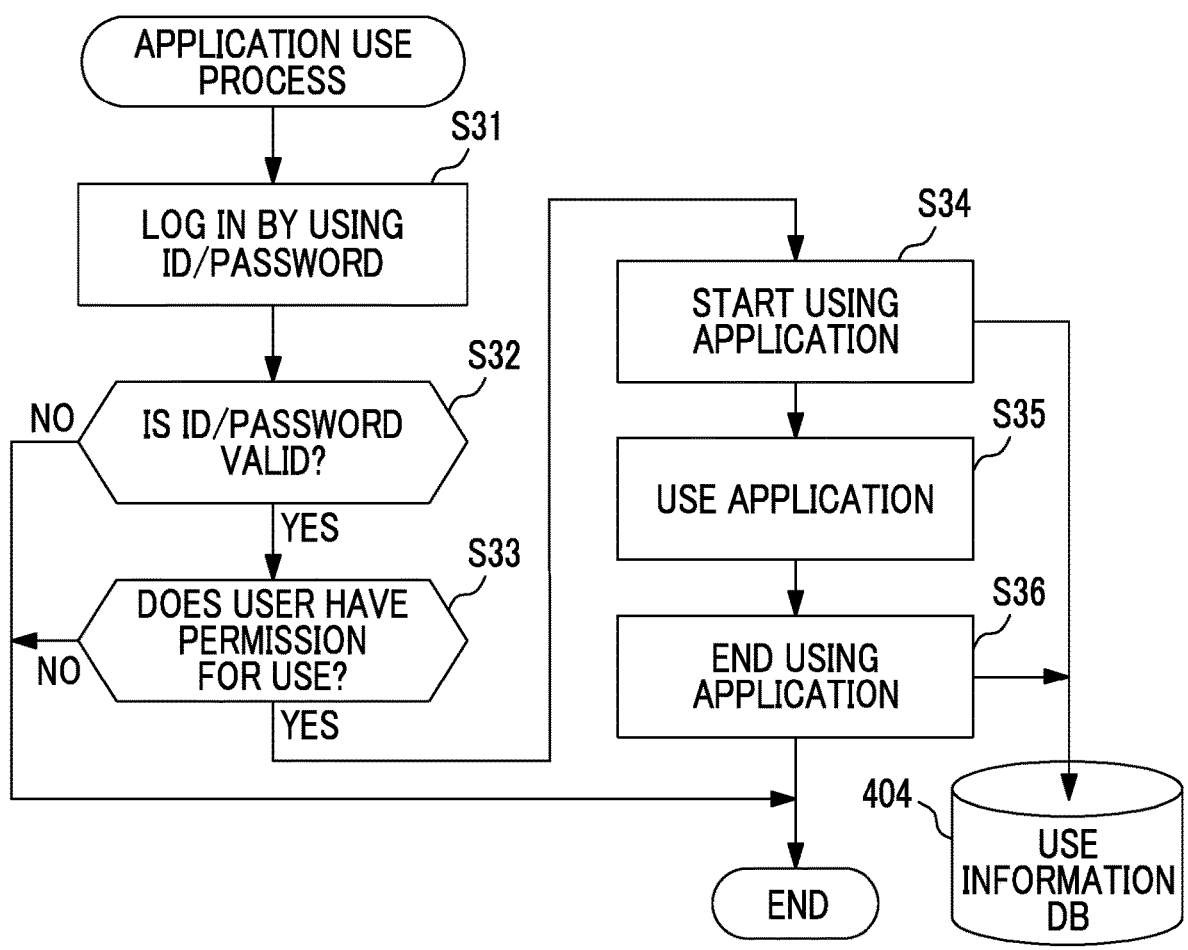
FIG. 10 is a flowchart illustrating an executed application use process.

FIG. 10 is a flowchart illustrating an application use process executed in the present exemplary embodiment. The application use process is executed in a case where the user uses the application which is a license target by operating the user terminal 110.

The user who wants to use the application inputs the user ID and the password to the user terminal 110 so as to log in to the license server 300 (step S31). The authentication server 200 determines whether or not the user ID and the password input by the user is valid based on the contract information DB 401 (step S32). In a case where the user ID and the password is not valid, the application use process is terminated. In a case where the user ID and the password is valid, the authentication server 200 causes the user terminal 110 to log in the license server 300. In this case, in the license server 300, the license verifying unit 310 refers to the contract information DB 401 to determine whether or not the user ID input to the user terminal 110 is the user ID of the user who has permission to use the license server 300 (step S33). In a case where a determination result is "NO", the application use process is terminated.

In a case where the determination result in step S33 is "YES", the license server 300 causes the record management unit 330 to execute a procedure for starting the use of the application (step S34). Specifically, the record management unit 330 permits the logged-in user to use the application and stores a use start time of the application. Accordingly, the user uses the application provided from the license server 300 by using the user terminal 110 (step S35).

In a case where the user completes to use the application or a logoff procedure is executed, the license server 300 causes the record management unit 330 to execute a procedure for terminating the use of the application (step S36). Specifically, the record management unit 330 sets an elapsed time from the use start time of the application to a use end time (or logoff time) of the application as the use time of the application and records the use time in the use information table (see FIG. 4E). In addition, at this time, the record management unit 330 updates items of the reservation/record difference in the use information table. For example, in a case of the user having the user ID=fx29710, the planned use amount is 12 hours (see second reservation table in FIG. 4B), whereas the use records are 4 hours on March 1 and 4 hours on March 2, which is a total of 8 hours, the reservation/record difference is 12 hours (planned)−8 hours (record)=4 hours. In a case where the process in step S36 is completed, the application use process is terminated.

Figure 11:
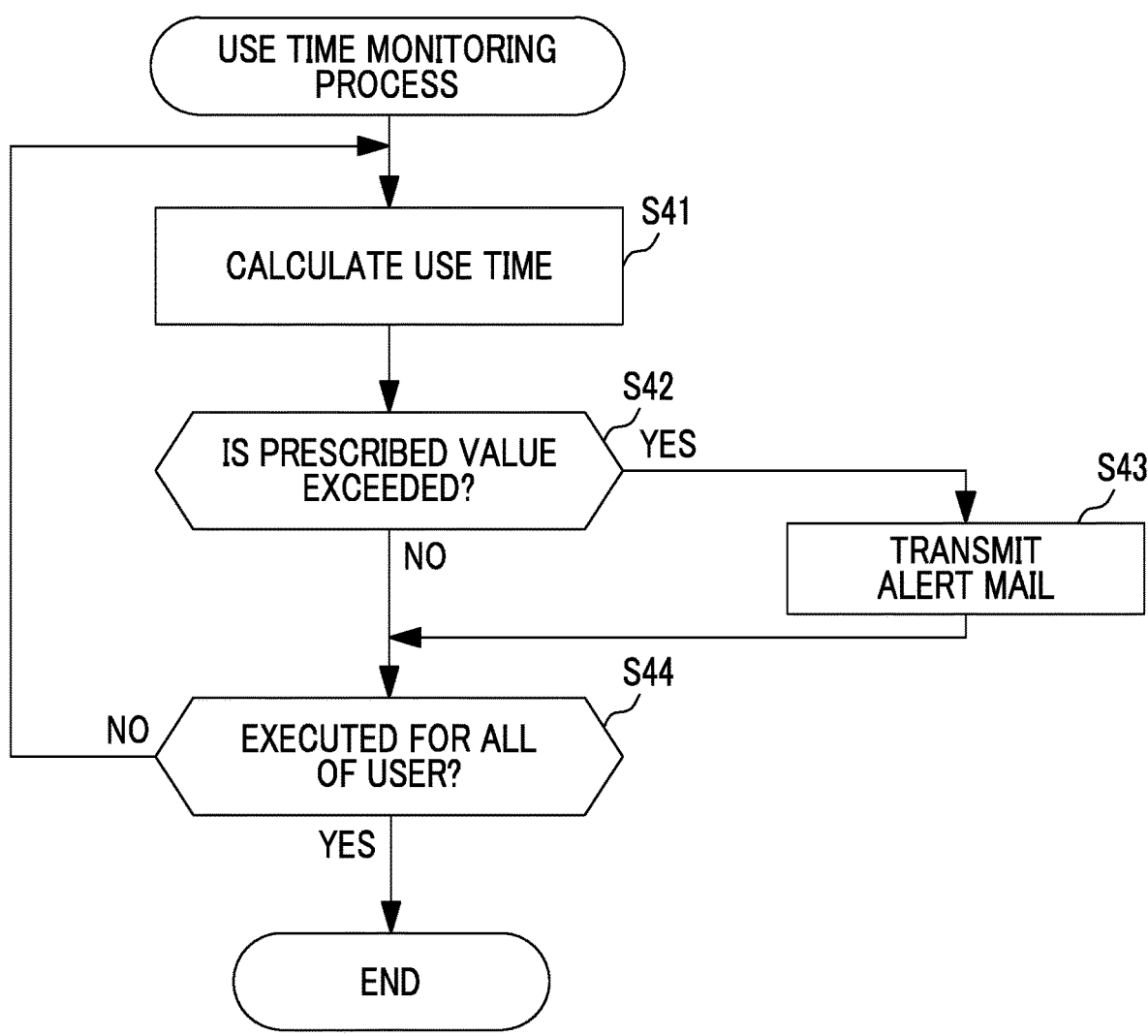
FIG. 11 is a flowchart illustrating a use time monitoring process.

FIG. 11 is a flowchart illustrating a use time monitoring process executed in the present exemplary embodiment. The use time monitoring process is executed at certain time intervals by, for example, timer interruption in the license server 300.

First, the license server 300 executes a use time calculation process on one user who uses the application (step S41). More specifically, at this time, in a case where the user logs in the license server 300 but does not uses the application, the license server 300 obtains a total sum of the use times in the current month in association with the user ID of the user in the use information table (see FIG. 4E) as the use time. In addition, at this time, in a case where the user logs in the license server 300 and uses the application, the license server 300 obtains a total sum of the use times in the current month in association with the user ID of the user in the use information table and obtains the use time by adding an elapsed time from the use start time of the application of the user to a current time to the total sum.

Next, in the license server 300, the record management unit 330 reads the upper limit value and the prescribed value in association with the user ID of the user from the upper limit value setting table (see FIG. 4C) and determines whether or not the use time of the user obtained in step S41 is larger than a value obtained by multiplying the prescribed value by the upper limit value (step S42). In a case where a determination result is "NO", the processes in step S41 and step S42 are executed on the remaining users. In addition, in a case where the determination result in step S42 is "YES", the alert mail is transmit to the user (step S43). Then, the processes in step S41 and step S42 are executed on the remaining users. In the use time monitoring process, the processes in step S41 to step S43 are executed on all of the users.

FIG. 12 is a diagram illustrating an example of the alert mail transmitted in step S42. As illustrated in FIG. 12, the alert mail includes information specifying the user and each piece of information of a message that the use time exceeds the prescribed value, the upper limit value, and the use time ("current: 29 hours" in FIG. 12).

The user who receives the alert mail consults with the administrator. As a result of the consultation with the user, in a case of acknowledging the necessity, the administrator operates the administrator terminal 120 to activate the administrator process described above (FIG. 5).

In this case, the administrator may select two options as a means for enabling the user to use the application.

First, the administrator activates the administrator process described above (see FIG. 5) and selects the upper limit value change in step S14. In a case where the administrator selects the upper limit value change, in the license server 300, the changing unit 340 displays the management screen illustrated in FIG. 6 on the administrator terminal 120 so as to receive the upper limit value changed by the administrator (step S51). In this case, the administrator may request the change to increase the upper limit value for the user who consults with the administrator. The changing unit 340 refers to the buffer in association with the administrator ID of the administrator in the resource assignment table (see FIG. 4D) so as to determine whether or not an increment of the upper limit value in a case of receiving the change request of the upper limit value by the user is larger than the buffer (step S152).

In a case where a determination result is "NO", the changing unit 340 returns the process to step S151 and the upper limit value is input again by the change request. In addition, in a case where the determination result in step S152 is "YES", the changing unit 340 updates the DB (step S153). Specifically, the changing unit 340 receives the changed upper limit value for the user and sets the upper limit value changed by the administrator as the upper limit value corresponding to the user ID of the user in the upper limit value setting table (step S153). Next, in the license server 300, the notification unit 350 transmits the change notification mail of the upper limit value to the user and the administrator who change the upper limit value (step S154). In a case where the process in step S154 is completed, the administrator process is terminated.

FIG. 13 is a diagram illustrating an example of the change notification mail of the upper limit value transmitted in step S154. As illustrated in FIG. 13, the change notification mail includes information specifying the user and the administrator and each piece of information of a message that the upper limit value is changed, the upper limit value before change, and the upper limit value after change. Accordingly, the user may continue to use the application within a range of the changed upper limit value. The above is a first means for allowing the user to continue using the application.

A second means for allowing the user to continue using the application is provided to change the prescribed value. That is, the administrator activates the administrator process (see FIG. 5) and selects the prescribed value change in step S14. In a case where the administrator selects the prescribed value change, in the license server 300, the changing unit 340 displays the management screen illustrated in FIG. 6 on the administrator terminal 120 so as to receive the prescribed value changed by the administrator (step S161). In this case, the administrator may request the change to increase the prescribed value for the user who consults with the administrator. The changing unit 340 determines whether or not the input prescribed value is an appropriate value within 100% (step S162). In a case where a determination result is "NO", the changing unit 340 returns the process to step S161 and the prescribed value is input again by the change request. In a case where the determination result in step S162 is "YES", the changing unit 340 sets the prescribed value input by the administrator as the prescribed value corresponding to the user ID in the upper limit value setting table (see FIG. 4C) (step S163). Next, in the license server 300, the notification unit 350 transmits the change notification mail of the prescribed value to the user and the administrator who change the prescribed value (step S164). In a case where the process in step S164 is completed, the administrator process is terminated.

FIG. 14 is a diagram illustrating an example of the change notification mail of the prescribed value transmitted in step S164. As illustrated in FIG. 14, the change notification mail includes information specifying the user and the administrator and each piece of information of a message that the prescribed value is changed, the prescribed value before change, and the prescribed value after change.

In a case where the prescribed value is changed to a large value, the alert mail is not transmitted until the use time of the application of the user exceeds the changed prescribed value, and the user may continue using the application.

As described above, according to the present exemplary embodiment, in a case where the user having the use time of the application likely to exceed the upper limit value exists among the plurality of users, the changing unit 340 changes to increase the upper limit value of the user within the range of the total amount. Therefore, it is possible to change the upper limit value of the use by each of the users while keeping an upper limit of the total use time for all of the users. In addition, according to the present exemplary embodiment, an increment of the upper limit value is permitted within a range not exceeding the buffer obtained by subtracting the total sum of the use reservation times of the application for the plurality of users from the total amount. Therefore, it is possible to appropriately assign the use amount to the user who is likely to exceed the upper limit value. In addition, according to the present exemplary embodiment, since the message that you exceed upper limit value is notified to the user who is likely to exceed the upper limit value (specifically, user who exceeds the prescribed value), it is possible to prevent the use time from exceeding the upper limit value in advance. Further, according to the present exemplary embodiment, since the user who is likely to exceed the upper limit value is notified to the administrator of the contract, it is possible to cause the administrator of the contract to take appropriate measures.

3. Modification Example

The present invention is not limited to the exemplary embodiments described above, and various modification examples may be made. Hereinafter, modification examples will be described. Two or more modification examples among the following modification examples may be used in combination.

(1) In the exemplary embodiment, the use time of the application is managed as the use amount of the service, but, for example, a storage capacity used by the application, the amount of processed data generated by execution of the application, a communication amount, the number of accesses, and the like may be managed as the use amount of the service.

(2) In a case where a certain user is likely to exceed the upper limit value, the changing unit 340 may assign the use time from the users other than the user belonging to the same administrator to the user who is likely to exceed the upper limit value. Specifically, in a case where the administrator requests to change the upper limit value for the user who is likely to exceed the upper limit value, the changing unit 340 selects a user who has the longest time obtained by subtracting the use time record from the reservation use time among the users other than the user, decreases the upper limit value of the user, and increases the upper limit value of the user by the decrement. Alternatively, the changing unit 340 may select a user who has the longest time obtained by subtracting the use time record from the upper limit value among the users other than the user, decrease the upper limit value of the user, and increase the upper limit value of the user by the decrement. According to this aspect, it is possible to reduce a burden on the administrator for taking measures to cause the user to continue using the application.

(3) The process of the changing unit 340 may be performed without waiting for the request from the administrator. Specifically, in the case where the user who may exceed the prescribed value exists, according to the process described above, the changing unit 340 selects a user who decreases the upper limit value from the users other than the user and transmits a message asking whether or not to increase the upper limit value of the user by decreasing the upper limit value of the user to the administrator to which the user belongs. In a case where the administrator returns an approval of a message that the upper limit value of the user may be decreased so as to increase the upper limit value of the user, the changing unit 340 changes the upper limit values of both of the users. On the other hand, in a case where the approval is not returned, the changing unit 340 does not change the upper limit values of both of the users. According to this aspect, it is possible to further reduce the burden on the administrator for taking measures to cause the user to continue using the application.

(4) In the exemplary embodiment described above, the time obtained by subtracting the total sum of the use reservation times of the plurality of users from the total amount is set as the buffer. However, instead of the time, a time obtained by subtracting a total sum of the upper limit values of the plurality of users from the total amount may be used as the buffer.

(5) A correspondence between the functional components and the hardware components in the license management system 1000 is not limited to those described in the exemplary embodiment. For example, the functions of the license server 300 may be distributed and mounted on a plurality of computer devices.

(6) The UI screen such as the input screen or the like and the various information illustrated in the exemplary embodiment are merely examples. For example, some of the UI elements among the screens illustrated in the exemplary embodiments may be omitted.

(7) The program executed by the processor 101 or the like may be provided by being recorded in a recording medium such as a CD-ROM or the like or may be provided in a state stored in a server apparatus on the network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A server apparatus comprising a processor configured to:
   obtain a total amount of use permitted according to a contract in a service used by a plurality of users;
   obtain an upper limit value of use of the service for each of the plurality of users; and
   change, in a case where a user having a use amount of the service likely to exceed the upper limit value exists among the plurality of users, the upper limit value of the user to be increased within a range of the total amount,
   wherein the total amount includes a total sum of planned use amounts of the service for the plurality of users and a use amount shared by the plurality of users, and the processor assigns the use amount from the use amount shared by the plurality of users to the user who is likely to exceed the upper limit value.

2. The server apparatus according to claim 1,
   wherein the processor assigns a use amount from a user other than the user who is likely to exceed the upper limit value to the user who is likely to exceed the upper limit value among the plurality of users.

3. The server apparatus according to claim 1, wherein the processor is further configured to:
   notify the user who is likely to exceed the upper limit value that the user is likely to exceed the upper limit value.

4. The server apparatus according to claim 1, wherein the processor s further configured to:
   notify, in a case where the user who is likely to exceed the upper limit value exists, an administrator of the contractthat the user is likely to exceed the upper limit value.

5. The server apparatus according to claim 4,
   wherein in a case where the administrator approves, the processor changes the upper limit value of the user who is likely to exceed the upper limit value.

6. The server apparatus according to claim 5,
   wherein in a case where the administrator does not approve, the processor does not change the upper limit value of the user who is likely to exceed the upper limit value.

7. A license management system comprising:
   a server apparatus; and
   an administrator terminal,
   wherein the server apparatus includes a processor configured to:
      obtain a total amount of use permitted according to a contract in a service used by a plurality of users,
      obtain an upper limit value of use of the service for each of the plurality of users, and
      change, in a case where a user having a use amour of the service likely to exceed the upper limit value exists among the plurality of users, the upper limit value of the user to be increased within a range of the total amount, wherein the total amount includes a total sum of planned use amounts of the service for the plurality of users and a use amount shared by the plurality of users, and the processor assigns the use amount from the use amount shared by the plurality of users to the user who is likely to exceed the upper limit value, and
   the administrator terminal includes
      another processor that instructs the processor to change the upper limit value.

\* \* \* \* \*